United States Patent
Onishi et al.

(10) Patent No.: US 9,386,367 B2
(45) Date of Patent: Jul. 5, 2016

(54) ELECTRONIC APPARATUS WITH DETACHABLE SPEAKERS, A BODY UNIT AND A CONTROL UNIT

(75) Inventors: Yasuharu Onishi, Kanagawa (JP); Yuichiro Kishinami, Kanagawa (JP); Shigeo Satou, Kanagawa (JP); Jun Kuroda, Kanagawa (JP); Yukio Murata, Kanagawa (JP); Motoyoshi Komoda, Kanagawa (JP); Nobuhiro Kawashima, Kanagawa (JP); Tatsuya Uchikawa, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 140 days.

(21) Appl. No.: 13/995,331

(22) PCT Filed: Nov. 25, 2011

(86) PCT No.: PCT/JP2011/006571
§ 371 (c)(1),
(2), (4) Date: Jun. 18, 2013

(87) PCT Pub. No.: WO2012/090382
PCT Pub. Date: Jul. 5, 2012

(65) Prior Publication Data
US 2013/0267275 A1    Oct. 10, 2013

(30) Foreign Application Priority Data
Dec. 28, 2010    (JP) .................. 2010-291869

(51) Int. Cl.
*H04B 1/08*    (2006.01)
*H04R 1/32*    (2006.01)
(Continued)

(52) U.S. Cl.
CPC .............. *H04R 1/323* (2013.01); *H04M 1/0254* (2013.01); *H04M 1/03* (2013.01); *H04R 2201/401* (2013.01); *H04R 2217/03* (2013.01); *H04R 2499/11* (2013.01)

(58) Field of Classification Search
CPC ........ H04R 1/02; H04R 1/345; H04R 1/2811; H04R 1/2819; H04R 1/2857; H04R 2420/05; H04R 3/12; G06F 1/1688
USPC ................. 381/322, 324, 332, 386, 387, 395; 455/90.3, 149, 350, 556.1, 557, 569.1, 455/575.1
See application file for complete search history.

(56) References Cited

U.S. PATENT DOCUMENTS 6,781,654 B2    8/2004    Kim et al.
7,071,917 B2    7/2006    Kori
(Continued)

FOREIGN PATENT DOCUMENTS

CN    1366203    8/2002
CN    101155436    4/2008
(Continued)

OTHER PUBLICATIONS

International Search Report PCT/JP2011/006571 dated Jan. 31, 2012, with English translation.
(Continued)

*Primary Examiner* — Allahyar Kasraian
(74) *Attorney, Agent, or Firm* — Young & Thompson

(57) ABSTRACT

An electronic apparatus (100) includes a first detachable speaker unit (120) including a first speaker having a relatively high directivity, and a second detachable speaker unit (130) including a second speaker having a relatively low directivity. The electronic apparatus (100) further includes a body unit (an electronic apparatus body (110)) provided with a slot (113) in which any one of the first detachable speaker unit (120) and the second detachable speaker unit (130) is detachably installed therein in an alternative way, and a control unit that is provided in the body unit and controls the first and second speakers.

15 Claims, 9 Drawing Sheets

(51) Int. Cl.
*H04M 1/02* (2006.01)
*H04M 1/03* (2006.01)

(56) References Cited

U.S. PATENT DOCUMENTS

| | | | |
|---|---|---|---|
| 2002/0186860 A1* | 12/2002 | Ogura et al. | 381/398 |
| 2004/0170282 A1* | 9/2004 | Tahara et al. | 381/58 |
| 2004/0196985 A1 | 10/2004 | Kokubo | |
| 2004/0204194 A1* | 10/2004 | Akai et al. | 455/575.1 |
| 2007/0274541 A1* | 11/2007 | Uetake et al. | 381/150 |
| 2008/0037819 A1* | 2/2008 | Yang et al. | 381/395 |
| 2008/0080730 A1* | 4/2008 | Takakusaki | 381/300 |
| 2008/0220812 A1* | 9/2008 | Wang | 455/550.1 |
| 2008/0290757 A1* | 11/2008 | Gao et al. | 310/322 |
| 2009/0010479 A1* | 1/2009 | Chen | 381/395 |
| 2009/0154736 A1* | 6/2009 | Lee et al. | 381/300 |
| 2009/0156273 A1* | 6/2009 | Romesburg et al. | 455/575.3 |
| 2011/0194719 A1* | 8/2011 | Frater | 381/332 |

FOREIGN PATENT DOCUMENTS

| | | |
|---|---|---|
| CN | 101459710 | 6/2009 |
| JP | 2000-042122 | 2/2000 |
| JP | 2000-184488 | 6/2000 |
| JP | 2002-027586 | 1/2002 |
| JP | 2002-278646 | 9/2002 |
| JP | 2003-263241 | 9/2003 |
| JP | 2006-279288 | 10/2006 |
| JP | 2006-339852 | 12/2006 |
| JP | 2007-166584 | 6/2007 |
| JP | 2008-085902 | 4/2008 |
| WO | 2004091251 | 10/2004 |

OTHER PUBLICATIONS

Chinese Office Action, dated Feb. 28, 2015, in corresponding Chinese Patent Application No. 201180063096.0.
Japanese Office Action dated Oct. 13, 2015, with English Translation; Application No. 2012-550686.

* cited by examiner

ELECTRONIC APPARATUS WITH DETACHABLE SPEAKERS, A BODY UNIT AND A CONTROL UNIT

TECHNICAL FIELD

The present invention relates to an electronic apparatus.

BACKGROUND ART

In electronic apparatuses such as cellular phones, thin stylish devices having functions related to audio, such as a video phone call, moving image reproduction, or a hands-free call function, as commodity values have been developed. Examples of speakers of such electronic apparatuses include a speaker having a high directivity such as a parametric speaker and a speaker having a low directivity such as an electrodynamic speaker.

Patent Document 1 discloses a cellular phone including a plurality of slots in which a speaker unit can be installed.

Patent Document 2 discloses a cellular phone in which a speaker jack hole is formed in a body thereof and in which a plug of a speaker unit is inserted into the speaker jack hole, thereby allowing conversation to be performed using a speaker of the speaker unit.

RELATED DOCUMENT

Patent Document

[Patent Document 1] Japanese Unexamined Patent Publication No. 2006-279288
[Patent Document 2] Japanese Unexamined Patent Publication No. 2003-263241

DISCLOSURE OF THE INVENTION

Incidentally, there are various usage scenes of sound functions of an electronic apparatus such as a cellular phone. For example, one user uses the sound functions while the privacy of the user is ensured in a public place, or two or more persons hear a sound.

In the former case, a sound can only be heard in the vicinity of the user by using a speaker having a high directivity. In the latter case, a sound can be output in a radial fashion over a wide range from an electronic apparatus by using a speaker having a low directivity.

In addition, an electronic apparatus such as a cellular phone is required to be reduced in size.

An object of the invention is to provide an electronic apparatus capable of switching the directivity of a sound when necessary while the size of the electronic apparatus is prevented from increasing.

The invention provides an electronic apparatus including: a first detachable speaker unit that includes a first speaker having a relatively high directivity; a second detachable speaker unit that includes a second speaker having a relatively low directivity; a body unit that is provided with a slot in which anyone of the first detachable speaker unit and the second detachable speaker unit is detachably installed therein in an alternative way; and a control unit that is provided in the body unit and controls the first and second speakers.

According to the invention, the directivity of a sound can be switched when necessary while the size of the electronic apparatus is prevented from increasing.

BRIEF DESCRIPTION OF THE DRAWINGS

The above-described objects, other objects, features and advantages will be further apparent from the preferred embodiments described below, and the accompanying drawings as follows.

DESCRIPTION OF EMBODIMENTS

Figure 1:
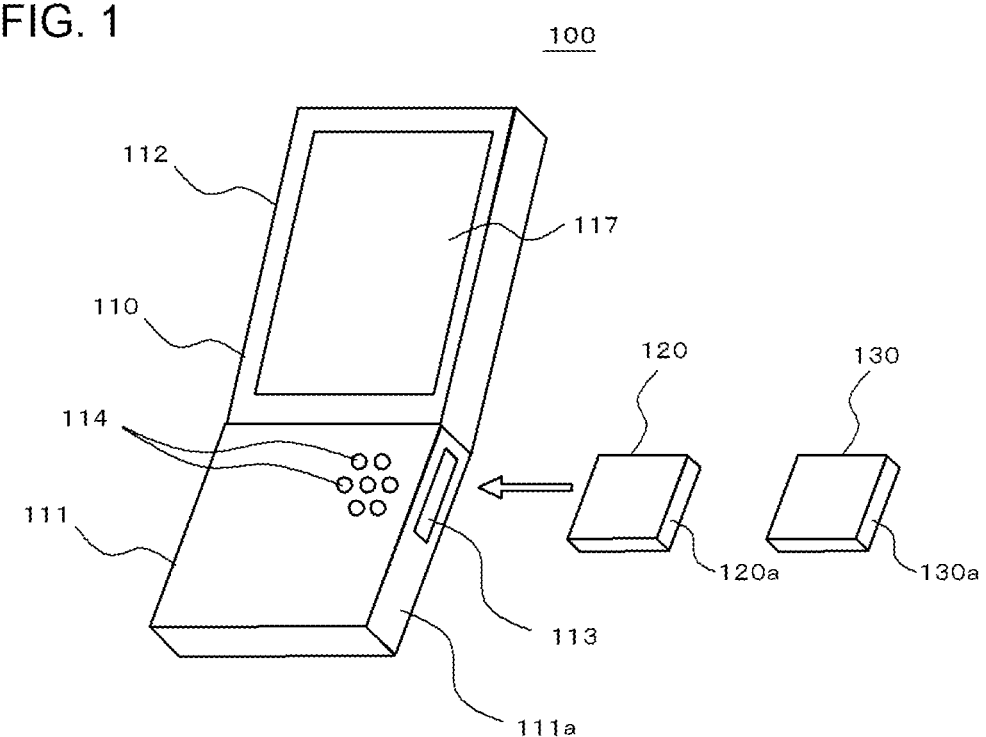
FIG. 1 is an exploded perspective view of an electronic apparatus according to a first embodiment.

Hereinafter, embodiments of the invention will be described with reference to the accompanying drawings. In addition, in all the drawings, same reference numerals denote like components, and a description thereof will not be repeated.

First Embodiment

Figure 2:
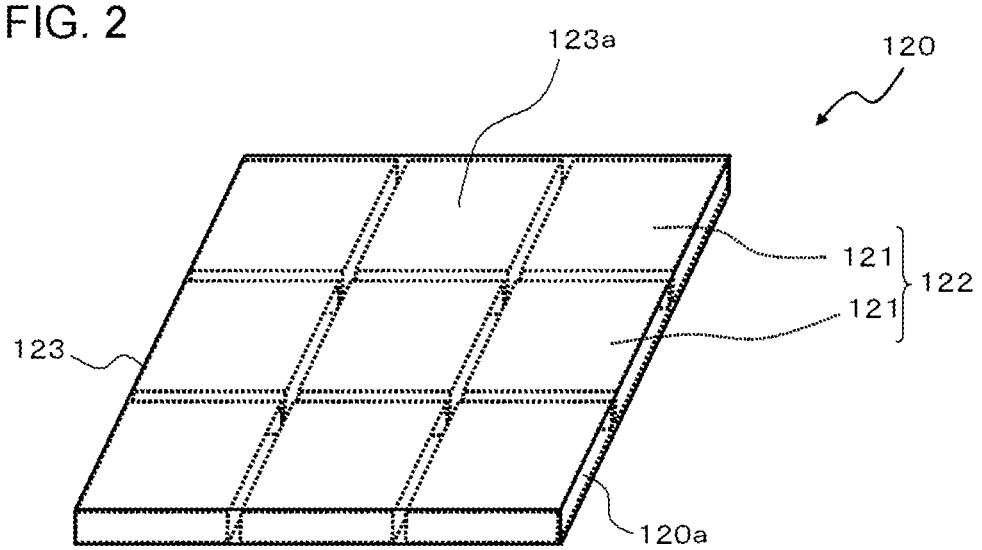
FIG. 2 is a perspective view of a first detachable speaker unit.
Figure 3:
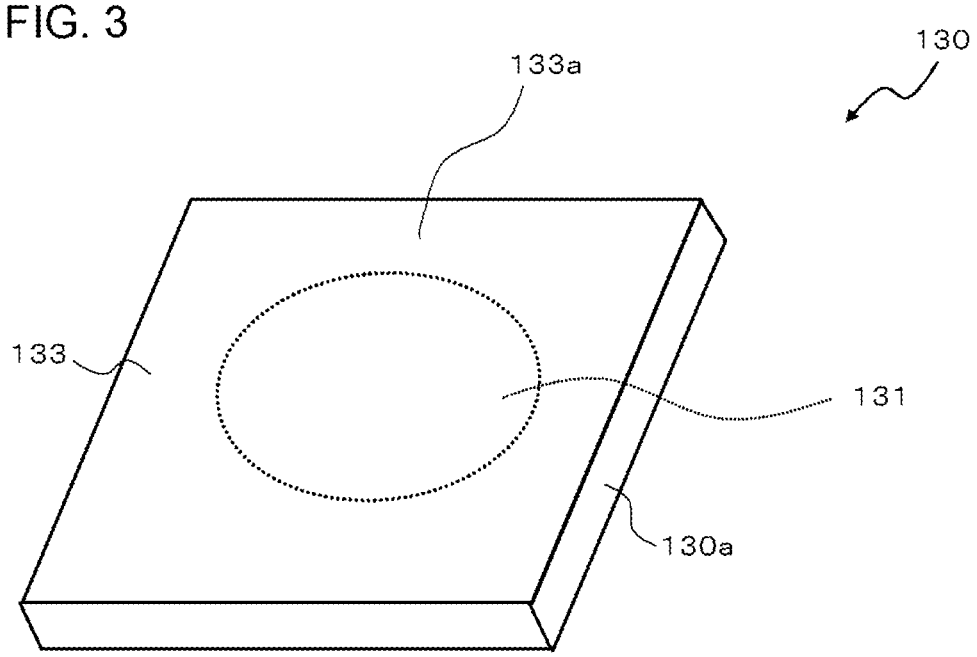
FIG. 3 is a perspective view of a second detachable speaker unit.
Figure 4:
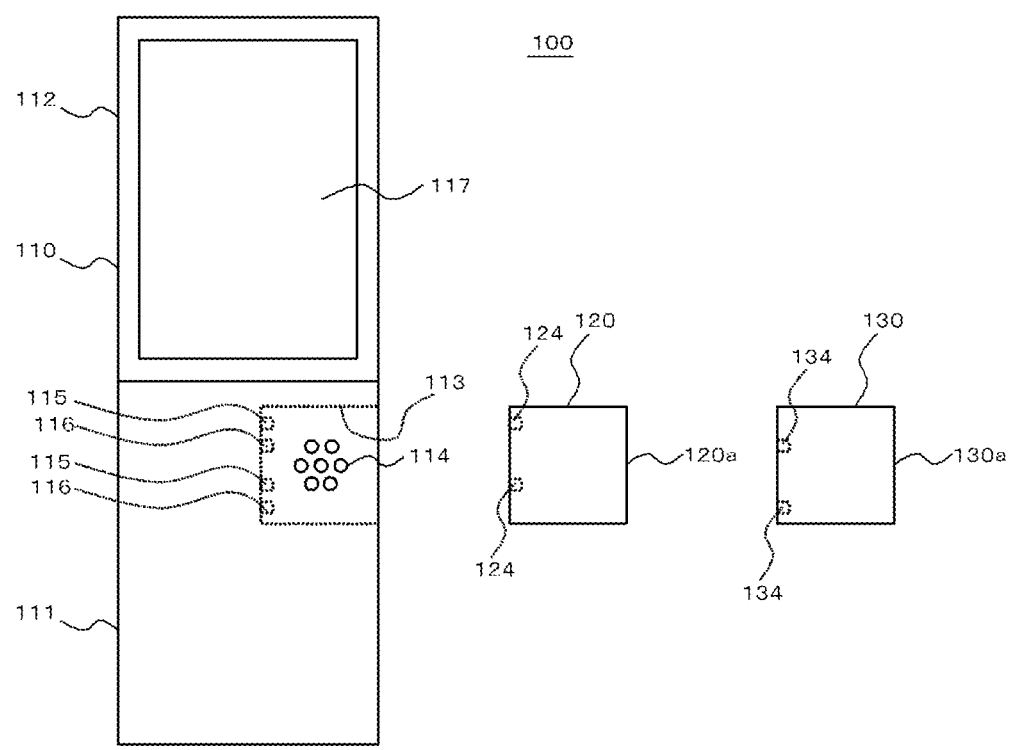
FIG. 4 is a plan view of the electronic apparatus according to the first embodiment.
Figure 5:
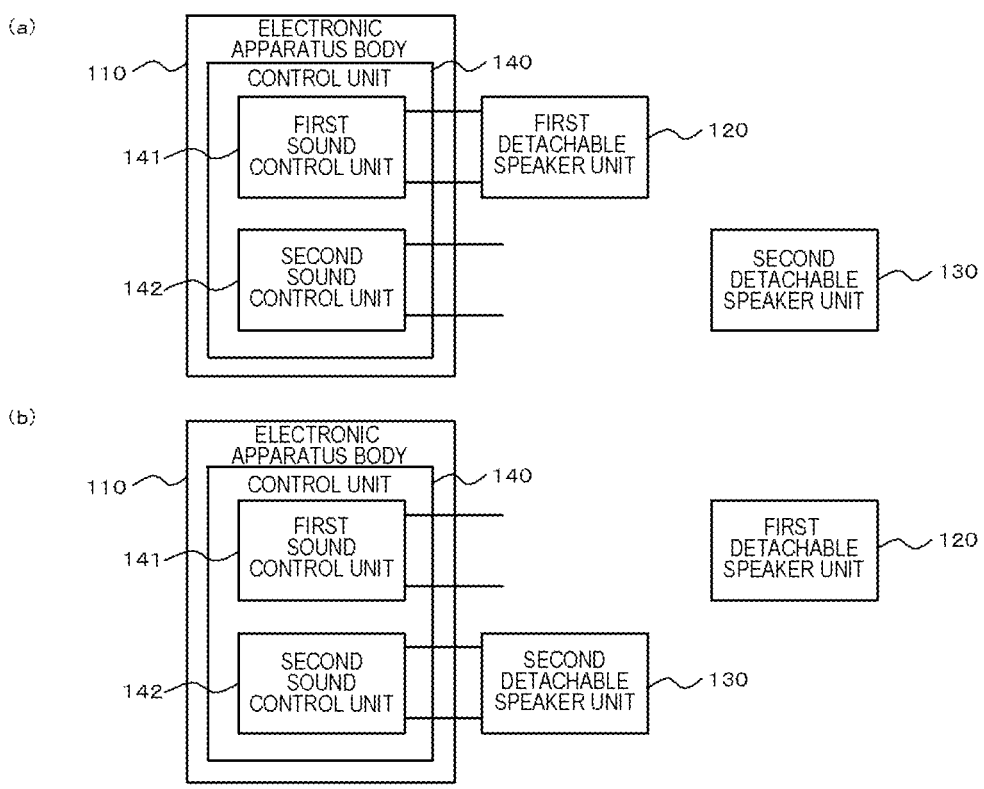
FIGS. 5(a) and 5(b) are block diagrams of the electronic apparatus according to the first embodiment.

FIG. 1 is an exploded perspective view of an electronic apparatus 100 according to a first embodiment. FIG. 2 is a perspective view of a first detachable speaker unit 120. FIG. 3 is a perspective view of a second detachable speaker unit 130. FIG. 4 is a plan view of the electronic apparatus 100 according to the first embodiment. FIG. 5 is a block diagram of the electronic apparatus 100 according to the first embodiment.

The electronic apparatus 100 according to the embodiment includes the first detachable speaker unit 120 including a first speaker (for example, a parametric speaker 122) having a relatively high directivity, a second detachable speaker unit 130 including a second speaker (for example, a speaker having a single piezoelectric element 131) having a relatively low directivity, a body unit (an electronic apparatus body 110) provided with a slot 113 in which any one of the first detachable speaker unit 120 and the second detachable speaker unit 130 is detachably installed therein in an alternative way, and a control unit 140 that is provided in the body unit and controls the first and second speakers. For example, the electronic apparatus is a portable terminal device such as a cellular phone, a PDA (personal Digital Assistant), a small-sized game machine, or a laptop personal computer. The embodiment will now be described in detail.

As illustrated in FIG. 1, the electronic apparatus 100 according to the embodiment is, for example, a cellular phone. The electronic apparatus 100 includes the electronic apparatus body 110, the first detachable speaker unit 120, and the second detachable speaker unit 130.

As will be described below in detail, each of the first and second detachable speaker units 120 and 130 includes a speaker. The speaker (as will be described below, for example, the parametric speaker 122) included in the first detachable speaker unit 120 has a higher directivity than the speaker (as will be described below, for example, the speaker having the single piezoelectric element 131 that outputs an audible sound) included in the second detachable speaker unit 130.

The first detachable speaker unit 120 and the second detachable speaker unit 130 have the same exterior shape.

The slot 113 is formed in the electronic apparatus body 110. The slot 113 is configured such that any one of the first detachable speaker unit 120 and the second detachable speaker unit 130 is detachably installed therein in an alternative way.

The first and second detachable speaker units 120 and 130 are formed so as to be flat (thin). For example, the first and second detachable speaker units 120 and 130 are formed in a rectangular shape when seen in a plan view.

An internal space of the slot 113 has a shape capable of substantially tightly accommodating any one of the first detachable speaker unit 120 and the second detachable speaker unit 130.

In addition, in a state where the first detachable speaker unit 120 or the second detachable speaker unit 130 is installed in the slot 113, a thickness direction of the first detachable speaker unit 120 or the second detachable speaker unit 130 coincides with a thickness direction (for example, a thickness direction of a first housing 111 to be described later) of the electronic apparatus body 110.

The electronic apparatus body 110 is formed so as to be flat (thin). The electronic apparatus body 110 has the first housing 111 and a second housing 112 that are connected to each other so as to be opened and closed, for example, with a hinge mechanism interposed therebetween. For example, each of the first and second housings 111 and 112 are formed in a flat cuboid shape. Meanwhile, for example, the second housing 112 is provided with a liquid crystal display device 117 so as to perform various display operations.

In addition, for example, the slot 113 is formed so as to open in a lateral surface (for example, a lateral surface 111a of the first housing 111) of any one housing.

In a state where the first detachable speaker unit 120 is installed in the slot 113, for example, the lateral surface 111a and a lateral surface 120a of the first detachable speaker unit 120 are formed substantially on the same plane.

Similarly, in a state where the second detachable speaker unit 130 is installed in the slot 113, for example, the lateral surface 111a and a lateral surface 130a of the second detachable speaker unit 130 are formed substantially on the same plane.

Further, for example, a plurality of sound holes 114 for causing an internal space of the slot 113 and an external space of the electronic apparatus body 110 to communicate with each other are formed in the electronic apparatus body 110 (for example, the first housing 111).

As illustrated in FIG. 2, the first detachable speaker unit 120 includes the parametric speaker 122 having a plurality of piezoelectric elements 121 that are arranged, for example, in an array. Meanwhile, the first detachable speaker unit 120 has a case 123 that is formed, for example, in a flat cuboid shape. The plurality of piezoelectric elements 121 are accommodated in the case 123. A plurality of sound holes (not shown) are formed in an upper surface 123a of the case 123. At least one or more sound holes are formed at a position corresponding to each piezoelectric element 121.

In a state where the first detachable speaker unit 120 is installed in the slot 113, a sound wave that is oscillated from the piezoelectric elements 121 is output to the outside of the electronic apparatus body 110 through the sound holes and the sound holes 114.

Meanwhile, the lateral surface 120a is, for example, a lateral surface of the case 123.

As will be described below in detail, each of the plurality of piezoelectric elements 121 of the parametric speaker 122 oscillates ultrasonic waves (for example, having a frequency equal to or more than 20 kHz), and the ultrasonic waves oscillated from the piezoelectric elements 121 are demodulated, thereby reproducing an audible sound. The parametric speaker 122 is configured so as to be capable of forming a sound field in which the audible sound is reproduced in a specific region using, for example, a phased array method.

As illustrated in FIG. 3, the second detachable speaker unit 130 has, for example, the single piezoelectric element 131. The piezoelectric element 131 is formed so as to have a larger plane than the piezoelectric element 121. Meanwhile, the second detachable speaker unit 130 has a case 133 that is formed, for example, in a flat cuboid shape. The piezoelectric element 131 is accommodated in the case 133. A plurality of sound holes (not shown) are formed in an upper surface 133a of the case 133.

In a state where the second detachable speaker unit 130 is installed in the slot 113, a sound wave that is oscillated from the piezoelectric element 131 is output to the outside of the electronic apparatus body 110 through the sound holes and the sound holes 114.

Meanwhile, the lateral surface 130a is, for example, a lateral surface of the case 133.

The piezoelectric element 131 is configured so as to oscillate (output) an audible sound (for example, having a frequency of 100 Hz to 10 kHz).

As illustrated in FIG. 4, a plurality of first terminals 124 are formed in the first detachable speaker unit 120 (for example, in a rear surface of the first detachable speaker unit 120). The first terminals 124 are electrically connected to the piezoelectric elements 121 of the parametric speaker 122.

Similarly, a plurality of second terminals 134 are formed in the second detachable speaker unit 130 (for example, in a rear surface of the second detachable speaker unit 130). The second terminals 134 are electrically connected to the piezoelectric element 131.

In addition, a plurality of third terminals 115 and a plurality of fourth terminals 116 are formed in the slot 113.

Each first terminal 124 contacts the corresponding third terminal 115 by installing the first detachable speaker unit 120 in the slot 113.

On the other hand, each second terminal 134 contacts the corresponding fourth terminal 116 by installing the second detachable speaker unit 130 in the slot 113.

In the embodiment, the arrangement of the first terminals 124 in the first detachable speaker unit 120 is different from the arrangement of the second terminals 134 in the second detachable speaker unit 130. In addition, the third terminals 115 and the fourth terminals 116 are disposed so as to be spaced apart from each other.

As illustrated in FIG. 5, the electronic apparatus body 110 is provided with the control unit 140 that controls the piezoelectric elements 121 of the parametric speaker 122 and the piezoelectric element 131 of the second detachable speaker unit 130. The control unit 140 is provided in, for example, one housing (for example, the first housing 111).

The control unit 140 includes a first sound control unit 141 for controlling the piezoelectric elements 121 of the parametric speaker 122 and a second sound control unit 142 for controlling the piezoelectric element 131.

The first sound control unit 141 is electrically connected to the third terminals 115. In a state where the first detachable speaker unit 120 is installed in the slot 113, the first terminals 124 contact to the third terminals 115, and the first sound control unit 141 controls the piezoelectric elements 121 of the parametric speaker 122 through the third terminals 115 and the first terminals 124 (FIG. 5(a)).

In addition, the second sound control unit 142 is electrically connected to the fourth terminals 116. In a state where the second detachable speaker unit 130 is installed in the slot 113, the second terminals 134 contact to the fourth terminals 116, and the second sound control unit 142 controls the piezoelectric element 131 through the fourth terminals 116 and the second terminals 134 (FIG. 5(b)).

The attachment and the detachment of the first detachable speaker unit 120 with respect to the slot 113 are implemented using, for example, the following mechanism.

For example, the slot 113 is provided with a spring (not shown) that biases the first detachable speaker unit 120 in a direction in which the first detachable speaker unit 120 is pushed out of the slot 113. An engagement mechanism is provided in each of the slot 113 and the first detachable speaker unit 120 so that the first detachable speaker unit 120 engages with (latches to) the electronic apparatus body 110 using a first engagement mechanism that is not shown in the drawing by pushing the first detachable speaker unit 120 into the slot 113 against the biasing through the spring so as to install the first detachable speaker unit 120 in the slot 113.

In addition, when the first detachable speaker unit 120 installed in the slot 113 is ejected from the slot 113, for example, the engagement between the first detachable speaker unit 120 and the electronic apparatus body 110 can be released by pushing the first detachable speaker unit 120 once toward the inside of the slot 113 against the biasing through the spring. Thereafter, the push-in of the first detachable speaker unit 120 is released, and thus the first detachable speaker unit 120 is pushed outward from the slot 113 in accordance with the biasing of the spring, thereby allowing the first detachable speaker unit 120 to be easily ejected from the slot 113.

The same applies to the attachment and the detachment of the second detachable speaker unit 130 with respect to the slot 113.

Figure 6:
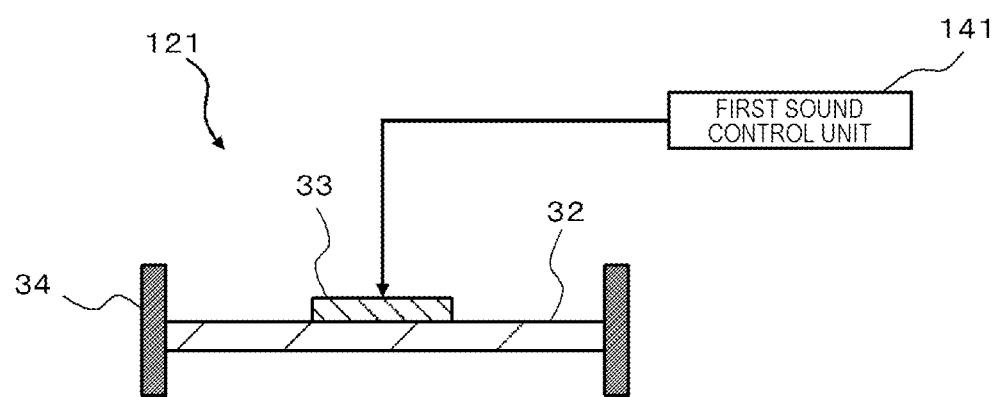
FIG. 6 is a schematic diagram of a piezoelectric element.

FIG. 6 is a schematic diagram of the piezoelectric elements 121 of the parametric speaker 122.

The piezoelectric element 121 includes a vibration member 32 having, for example, a sheet shape, a piezoelectric vibrator 33, and a supporting member 34. The piezoelectric vibrator 33 is attached to one surface of the vibration member 32. The supporting member 34 supports an edge of the vibration member 32. In addition, the supporting member 34 is fixed to the case 123 of the first detachable speaker unit 120.

The first sound control unit 141 constitutes an oscillation circuit that vibrates the piezoelectric vibrator 33 by inputting an oscillation signal to the piezoelectric vibrator 33 to thus oscillate a sound wave using the piezoelectric vibrator 33 and the vibration member 32.

The vibration member 32 vibrates by the vibration generated from the piezoelectric vibrator 33 and oscillates a sound wave having a frequency of, for example, equal to or more than 20 kHz. Meanwhile, the piezoelectric vibrator 33 also vibrates by itself to oscillate a sound wave having a frequency of, for example, equal to or more than 20 kHz. In addition, the vibration member 32 adjusts a fundamental resonance frequency of the piezoelectric vibrator 33. The fundamental resonance frequency of a mechanical vibrator depends on load weight and compliance. Since the compliance is a mechanical rigidity of a piezoelectric vibrator, the fundamental resonance frequency of the piezoelectric vibrator 33 can be controlled by controlling the rigidity of the vibration member 32. Meanwhile, the thickness of the vibration member 32 is preferably equal to or more than 5 µm and equal to or less than 500 µm. In addition, in the vibration member 32, the modulus of longitudinal elasticity which is an index indicating rigidity is preferably equal to or more than 1 Gpa and equal to or less than 500 GPa. When the rigidity of the vibration member 32 is excessively low or excessively high, there is a possibility of the characteristics and reliability of a mechanical vibrator being damaged. Meanwhile, the material constituting the vibration member 32 is not particularly limited as long as it is a material, such as a metal or a resin, having a high elastic modulus with respect to the piezoelectric vibrator 33 which is formed of a brittle material, but is preferably phosphor bronze, stainless steel or the like from the viewpoint of workability or costs.

The planar shape of the piezoelectric vibrator 33 is, for example, circular. However, the planar shape of the piezoelectric vibrator 33 is not limited to being circular. The piezoelectric vibrator 33 is configured such that the entirety of the surface facing the vibration member 32 is fixed to the vibration member 32 by an adhesive. Accordingly, the entirety of a one-sided surface of the piezoelectric vibrator 33 is constrained by the vibration member 32.

The first sound control unit 141 generates an electrical signal to be input to the piezoelectric vibrator 33, that is, a modulation signal in the piezoelectric element 121. Carrier waves of the modulation signal are ultrasonic waves having a frequency of, for example, equal to or more than 20 kHz, and specifically, ultrasonic waves having a frequency of, for example, 100 kHz. The first sound control unit 141 controls the piezoelectric vibrator 33 in response to a sound signal of a sound to be reproduced.

Figure 7:
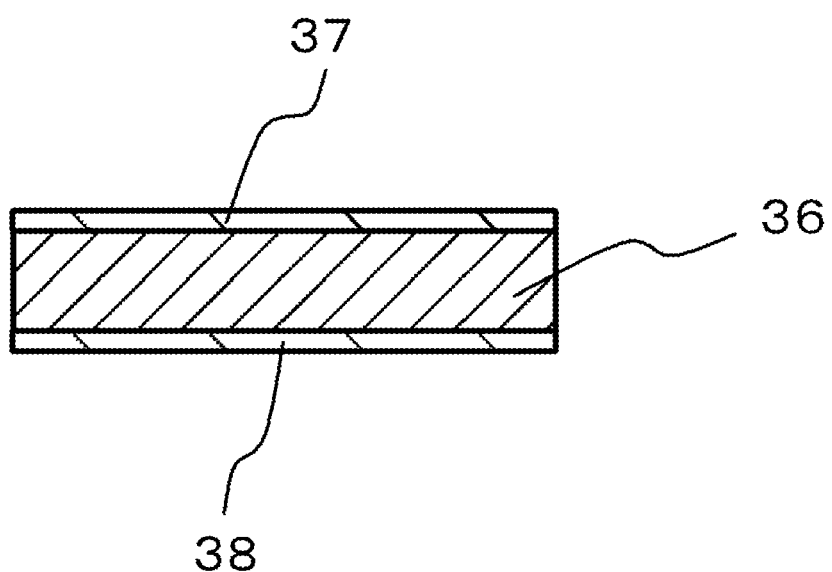
FIG. 7 is a cross-sectional view illustrating a layered structure of a piezoelectric vibrator.

FIG. 7 is a cross-sectional view illustrating a layered structure of the piezoelectric vibrator 33 in the thickness direction. The piezoelectric vibrator 33 has a piezoelectric body 36, an upper electrode 37, and a lower electrode 38.

The piezoelectric body 36 is polarized in the thickness direction. The material constituting the piezoelectric body 36 may be any of an inorganic material and an organic material as long as it is a material having a piezoelectric effect. However, the material is preferably a material having a high electro-mechanical conversion efficiency, for example, lead zirconate titanate (PZT) or barium titanate ($BaTiO_3$). A thickness h1 of the piezoelectric body 36 is, for example, equal to or more than 10 µm and equal to or less than 1 mm. When the thickness h1 is less than 10 µm, there is a possibility of the piezoelectric vibrator 33 being damaged during the manufacturing of the piezoelectric elements 121. In addition, when the thickness h1 exceeds 1 mm, the electro-mechanical conversion efficiency is excessively lowered, and thus there is a possibility that a sufficient large vibration cannot be obtained. The reason is because when the thickness of the piezoelectric vibrator 33 increases, the electric field intensity within the piezoelectric vibrator 33 is inversely proportional thereto and thus decreases.

Although the materials constituting the upper electrode 37 and the lower electrode 38 are not particularly limited, for example, silver or silver/palladium can be used. Since silver is used as a low-resistance versatile electrode material, there is an advantage in a manufacturing process or cost and the like. Since silver/palladium is a low-resistance material excellent in oxidation resistance, there is an advantage from the viewpoint of reliability. In addition, a thickness h2 of the upper electrode 37 and the lower electrode 38 is not particularly limited, but the thickness h2 is preferably equal to or more than 1 µm and equal to or less than 50 µm. In the thickness h2 of less than 1 µm, it is difficult to uniformly form the upper electrode 37 and the lower electrode 38. As a result, there is a possibility of the electro-mechanical conversion efficiency decreasing. In addition, when the film thicknesses of the upper electrode 37 and the lower electrode 38 exceed 100 μm, the upper electrode 37 and the lower electrode 38 serve as constraint surfaces with respect to the piezoelectric body 36, and thus there is a possibility of the energy conversion efficiency decreasing.

The piezoelectric vibrator 33 can be set to have an outer diameter of φ18 mm, an inner diameter of φ12 mm, and a thickness of 100 μm. In addition, as the upper electrode 37 and the lower electrode 38, for example, a silver/palladium alloy (having a weight ratio of, for example, 7:3) having a thickness of 8 μm can be used. In addition, as the vibration member 32, phosphor bronze having an outer diameter of φ20 mm and a thickness of 50 μm (0.3 mm) can be used. The supporting member 34 functions as a case of the piezoelectric element 121, and is formed to have, for example, a tubular shape (for example, cylindrical shape) having an outer diameter of φ22 mm and an inner diameter of φ20 ram.

The parametric speaker 122 emits ultrasonic waves (carrier waves) subjected to AM modulation, DSB modulation, SSB modulation, and FM modulation from each of the plurality of piezoelectric elements 121 into the air, and issues an audible sound based on the non-linear characteristics when ultrasonic waves are propagated into the air. The term "non-linear" herein indicates a transition from a laminar flow to a turbulent flow when the Reynolds number expressed by the ratio of the inertial action and the viscous action of a flow increases. Since the sound wave is very slightly disturbed within a fluid, the sound wave is propagated non-linearly. Particularly, in the ultrasonic wave frequency band, the non-linearity of the sound wave can be easily observed. When the ultrasonic waves are emitted into the air, higher harmonic waves associated with the non-linearity of the sound wave are conspicuously generated. In addition, the sound wave is in a sparse and dense state in which light and shade occur in the molecular density in the air. When it takes time for air molecules to be restored rather than compressed, the air which is not capable of being restored after the compression collides with air molecules continuously propagated, and thus a shock wave occurs. The audible sound is generated by this shock wave. That is, an audible sound is reproduced (demodulated) by the shock wave. The parametric speaker 122 has an advantage in that the directivity of a sound is high.

On the other hand, the piezoelectric element 131 is configured in the same manner as the piezoelectric element 121. The piezoelectric element 131 is controlled by the second sound control unit 142. A method of controlling the piezoelectric element 131 through the second sound control unit 142 is the same as a method of controlling the piezoelectric element 121 through the first sound control unit 141. The vibration member 32 of the piezoelectric element 131 vibrates by the vibration generated from the piezoelectric vibrator 33 of the piezoelectric element 131 and oscillates a sound wave. In addition, the piezoelectric vibrator 33 of the piezoelectric element 131 also oscillates a sound wave by vibrating by itself. However, the piezoelectric vibrator 33 and the vibration member 32 of the piezoelectric element 131 oscillate a sound wave having a frequency of, for example, 100 Hz to 10 kHz. Thus, the piezoelectric element 131 outputs an audible sound.

Next, a series of operations will be described.

For example, when one user uses the electronic apparatus 100 in a public place while the privacy of the user is ensured, that is, when the user does not desire a third party to hear a sound output from the electronic apparatus 100 (when a privacy sound source is necessary), the user installs the first detachable speaker unit 120 in the slot 113 by inserting the first detachable speaker unit 120 into the slot 113. In this state, when a sound is output from the electronic apparatus 100, the sound is output from the parametric speaker 122 under the control of the first sound control unit 141. Since the sound output from the parametric speaker 122 has a high directivity and has straightness, a sound wave can be propagated only in the vicinity of the user. Meanwhile, in order to narrow the direction in which the sound is output to a specific direction, for example, a phased array method can be used.

On the other hand, two or more persons hear a sound output from the electronic apparatus 100 (when a public sound source is necessary), a user installs the second detachable speaker unit 130 in the slot 113 by inserting the second detachable speaker unit 130 into the slot 113. In this state, when the sound is output from the electronic apparatus 100, an audible sound is output from the piezoelectric element 131 under the control of the second sound control unit 142. This sound is translationally propagated. That is, the sound is propagated in a radial fashion over a wide range from (for example, all around the electronic apparatus 100). Thus, two or more persons can hear the sound.

According to the above-described first embodiment, a user can easily change the speaker according to a usage scene of the electronic apparatus 100 by just exchanging the speaker unit (the first and second detachable speaker units 120 and 130) to be installed in the slot 113 of the electronic apparatus body 110. The speaker of each speaker unit is set to a predetermined frequency in advance, and the speaker units are selectively installed in the slot 113, and thus it is possible to easily change the speaker, thereby allowing various sound functions to be implemented. In other words, the directivity of the sound can be switched by changing the speaker.

In addition, as compared with a case where a plurality of types of speakers are mounted in the electronic apparatus 100, it is possible to reduce mounting restrictions and to prevent the size of the electronic apparatus 100 from increasing.

In short, it is possible to switch the directivity of the sound when necessary while the size of the electronic apparatus 100 is prevented from increasing.

In addition, since the first and second detachable speaker units 120 and 130 have the same exterior shape, it is possible to easily implement a configuration in which the first and second detachable speaker units 120 and 130 are alternatively installed in the same slot 113.

Specifically, the first detachable speaker unit 120 includes the plurality of piezoelectric elements 121. The piezoelectric element 121 has a high mechanical quality factor, vibration energy is concentrated on the vicinity of a resonance frequency. For this reason, the piezoelectric element 121 is particularly suitable for an ultrasonic wave vibrator for the parametric speaker 122 that uses a specific frequency band.

In addition, the second detachable speaker unit 130 includes, for example, the single piezoelectric element 131. As in the embodiment, the piezoelectric element 131 can also be used as a thin driving source of an electro-acoustic transducer that reproduces an audible sound.

Second Embodiment

Figure 8:
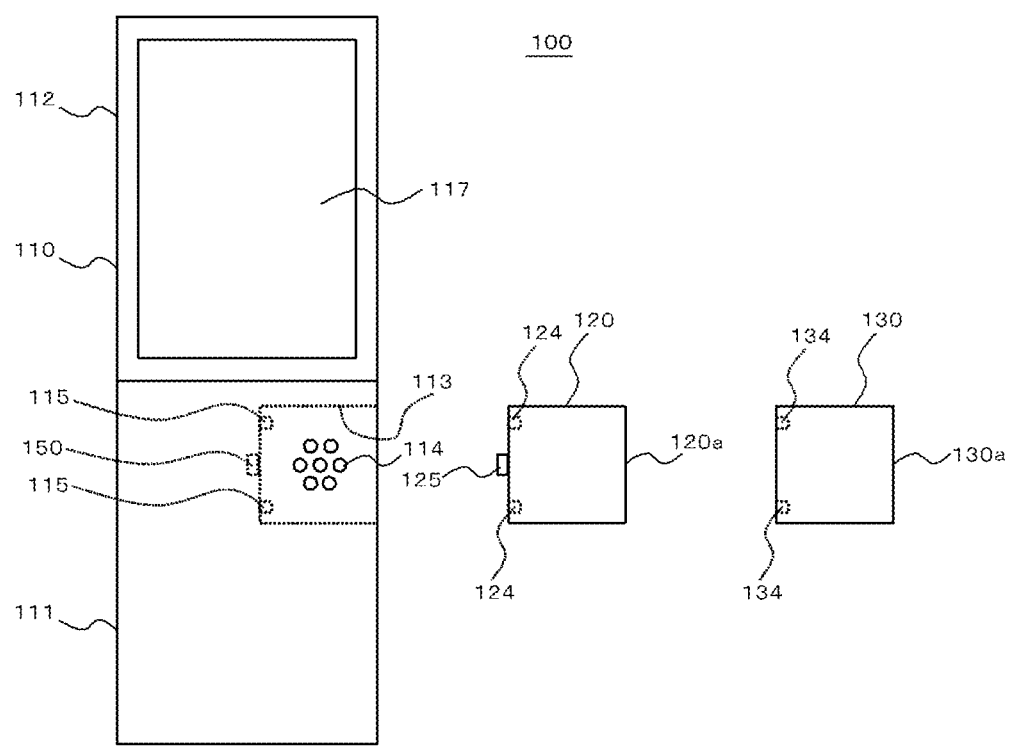
FIG. 8 is a plan view of an electronic apparatus according to a second embodiment.
Figure 9:
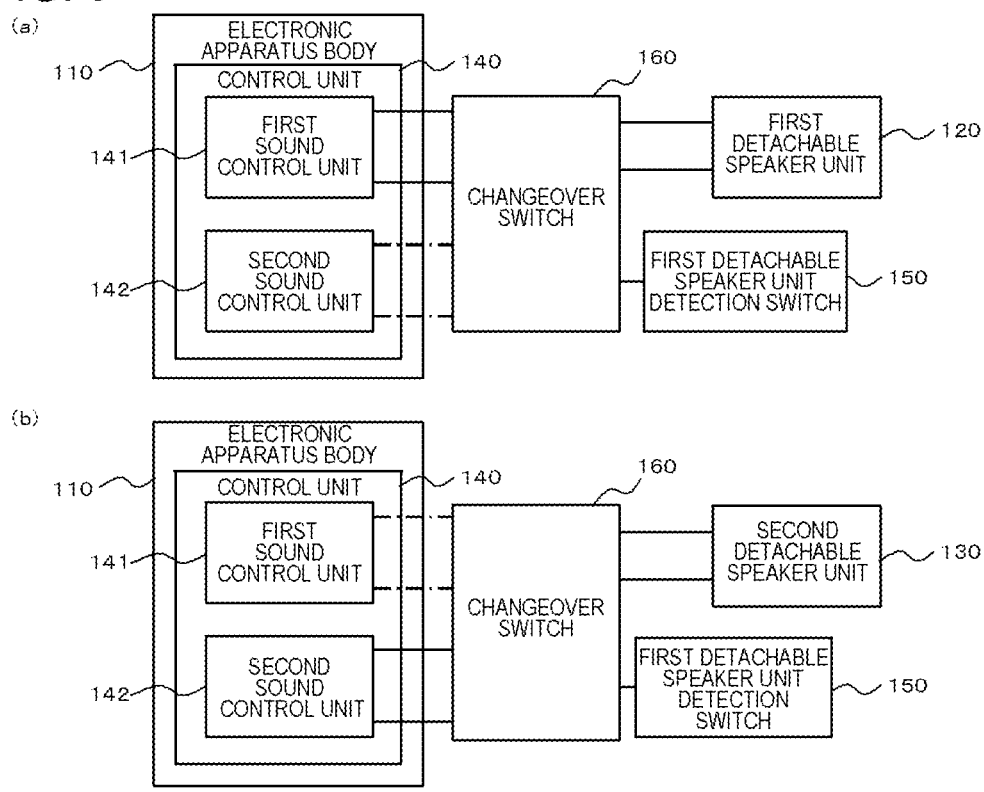
FIGS. 9(a) and 9(b) are block diagrams of the electronic apparatus according to the second embodiment.

FIG. 8 is a plan view of the electronic apparatus 100 according to a second embodiment. FIG. 9 is a block diagram of the electronic apparatus 100 according to the second embodiment.

In the above-described first embodiment, the example has been described in which the third terminals 115 contacting the terminals (the first terminals 124) of the first detachable speaker unit 120 and the fourth terminals 116 contacting the terminals (the second terminals 134) of the second detachable speaker unit 130 are formed inside the slot 113. On the other hand, in the second embodiment, the terminals (the third terminals 115) within the slot 113 are commonly used for the connection of the first terminals 124 and for the connection of the second terminals 134. In other words, the first terminals 124 come into contact with the third terminals 115 by installing the first detachable speaker unit 120 in the slot 113, and the second terminals 134 come into contact with the third terminals 115 by installing the second detachable speaker unit 130 in the slot 113. In the embodiment, the fourth terminals 116 are not formed inside the slot 113.

In addition, in the embodiment, for example, the electronic apparatus 100 has a changeover switch 160 that causes the third terminals 115 to be electrically connected to any one of the first sound control unit 141 and the second sound control unit 142 in an alternative way. The changeover switch 160 is provided in, for example, the first housing 111 of the electronic apparatus body 110.

The changeover switch 160 causes the third terminals 115 to be electrically connected to the first sound control unit 141 in a state where the first detachable speaker unit 120 is installed in the slot 113.

In addition, the changeover switch 160 causes the third terminals 115 to be electrically connected to the second sound control unit 142 in a state where the second detachable speaker unit 130 is installed in the slot 113.

In addition, in the embodiment, for example, the electronic apparatus 100 further includes a detection unit that detects whether or not any one of the first detachable speaker unit 120 and the second detachable speaker unit 130 is installed in the slot 113. The detection unit is, for example, a detection switch (for example, a first detachable speaker unit detection switch 150) that detects whether or not any one (for example, the first detachable speaker unit 120) of the first detachable speaker unit 120 and the second detachable speaker unit 130 is installed in the slot 113. The first detachable speaker unit detection switch 150 outputs a detection signal to the changeover switch 160 when the first detachable speaker unit 120 is installed in the slot 113. When the detection signal is input to the changeover switch 160, the changeover switch 160 causes the third terminals 115 to be electrically connected to the first sound control unit 141. Meanwhile, for example, except for a case where the first detachable speaker unit 120 is installed in the slot 113, the changeover switch 160 causes the third terminals 115 to be electrically connected to the second sound control unit 142. As such, the changeover switch 160 switches a connection destination of the third terminals 115 to the first sound control unit 141 or the second sound control unit 142 according to the detection results through the first detachable speaker unit detection switch 150.

Further, for example, a protrusion 125 is formed as a part to be detected by the detection switch (for example, the first detachable speaker unit detection switch 150) in any one (for example, the first detachable speaker unit 120) of the first detachable speaker unit 120 and the second detachable speaker unit 130. Meanwhile, a concave portion or the like may be formed instead of the protrusion 125.

According to the above-described second embodiment, the third terminals 115 within the slot 113 can be commonly used for the connection of the first terminals 124 and for the connection of the second terminals 134.

In the above-described embodiments, although the example has been described in which the speaker of the second detachable speaker unit 130 is constituted by the single piezoelectric element 131, the speaker of the second detachable speaker unit 130 may be an electrodynamic speaker (an electrodynamic electro-acoustic transducer). The electrodynamic speaker includes a permanent magnet, a voice coil, and a vibrating film.

In addition, in the above-described embodiments, although the example has been described in which the electronic apparatus 100 separately has the first sound control unit 141 that controls the parametric speaker 122 of the first detachable speaker unit 120 and the second sound control unit 142 that controls the speaker of the second detachable speaker unit 130, the parametric speaker 122 of the first detachable speaker unit 120 and the speaker of the second detachable speaker unit 130 may be individually controlled by a common control unit. In this case, it is detected which one of the first detachable speaker unit 120 and the second detachable speaker unit 130 is installed in the slot 113 by using, for example, the method described in the second embodiment, and the control unit outputs a control signal for controlling the corresponding speaker (for example, the parametric speaker 122 of the first detachable speaker unit 120 or the speaker of the second detachable speaker unit 130) to a third terminal according to the detection results.

The application claims the priority based on Japanese Patent Application No. 2010-291869 filed on Dec. 28, 2010, the content of which is incorporated herein by reference.

The invention claimed is:

1. An electronic apparatus comprising:
  a first detachable speaker unit that comprises a first surface and includes a first speaker having a first directivity;
  a second detachable speaker unit that comprises a second surface and includes a second speaker having a second directivity that is lower than the first directivity;
  a body unit that is provided with a slot in which any one of the first detachable speaker unit and the second detachable speaker unit is detachably installed therein in an alternative way; and
  a control unit that is provided in the body unit and controls the first speaker and the second speaker, the control unit including a first sound control unit that controls the first speaker and a second sound control unit that controls the second speaker, the first sound control unit controls the first speaker in a state where the first detachable speaker unit is installed in the slot, the second sound control unit controls the second speaker in a state where the second detachable speaker unit is installed in the slot;
  a first terminal that is formed on the first surface of the first detachable speaker unit and electrically connected to the first speaker;
  a second terminal that is formed on the second surface of the second detachable speaker unit and electrically connected to the second speaker;
  a third terminal that is formed on a bottom surface of the slot;
  a changeover switch that causes the third terminal to be electrically connected to any one of the first sound control unit and the second sound control unit in an alternative way; and
  a detection unit that detects which one of the first detachable speaker unit and the second detachable speaker unit is installed in the slot, the detection unit comprises a detection switch formed on the bottom surface of the slot,
  when the first terminal comes into contact with the third terminal by installing the first detachable speaker unit in the slot such that the first surface of the first detachable speaker unit and the bottom surface of the slot face each other, the changeover switch causes the third terminal to be electrically connected to the first sound control unit, and when the second terminal comes into contact with the third terminal by installing the second detachable speaker unit in the slot such that the second surface of the second detachable speaker unit and the bottom surface of the slot face each other, and the changeover switch causes the third terminal to be electrically connected to the second sound control unit, wherein one of the first surface of the first detachable speaker unit and the second surface of the second detachable speaker unit comprises a part to be detected, and the detection unit detects which one of the first detachable speaker unit and the second detachable speaker unit is installed in the slot, based on whether or not the detection switch detects the part to be detected, and the changeover switch switches a connection destination of the third terminal to the first sound control unit or the second sound control unit according to a detection results through the detection unit; and wherein the control unit oscillates the first speaker to output an ultrasonic wave from each of a plurality of regions that are arranged in an array, and the control unit further oscillates an audible sound from the second speaker.

2. The electronic apparatus according to claim 1, wherein the first detachable speaker unit and the second detachable speaker unit have a same exterior shape.

3. The electronic apparatus according to claim 1, wherein the first speaker is a parametric speaker.

4. The electronic apparatus according to claim 3, wherein the first speaker includes a plurality of piezoelectric vibrators that are arranged in an array.

5. The electronic apparatus according to claim 1, wherein the second speaker has a single piezoelectric vibrator.

6. The electronic apparatus according to claim 1, wherein the second speaker is an electrodynamic speaker.

7. The electronic apparatus according to claim 1, wherein the first speaker comprises a plurality of piezoelectric elements configured to vibrate at an ultrasound frequency of 20 kHz or more.

8. The electronic apparatus according to claim 7, wherein the ultrasound frequency is demodulated to produce an audible sound.

9. The electronic apparatus according to claim 1, wherein the second detachable speaker comprises a single piezoelectric element configured to oscillate at a frequency of 100 Hz to 10 kHz.

10. The electronic apparatus according to claim 1, wherein the part to be detected is a convex portion, and
the detection unit detects which one of the first detachable speaker unit and the second detachable speaker unit is installed in the slot, based on whether or not the convex portion is inserted into the detection switch.

11. An electronic apparatus comprising:
a first detachable speaker unit that comprises a first surface and includes a parametric speaker having a first directivity;
a second detachable speaker unit that comprises a second surface and includes a single piezoelectric element having a second directivity that is lower than the first directivity;
a body unit that is provided with a slot in which any one of the first detachable speaker unit and the second detachable speaker unit is detachably installed therein in an alternative way; and
a control unit that is provided in the body unit and controls the parametric speaker and the single piezoelectric element, the control unit including a first sound control unit that controls the parametric speaker and a second sound control unit that controls the single piezoelectric element, the first sound control unit controls the parametric speaker in a state where the first detachable speaker unit is installed in the slot the second sound control unit controls the single piezoelectric element in a state where the second detachable speaker unit is installed in the slot;

a first terminal that is formed on the first surface of the first detachable speaker unit and electrically connected to the parametric speaker;

a second terminal that is formed on the second surface of the second detachable speaker unit and electrically connected to the single piezoelectric element;

a third terminal that is formed on a bottom surface of the slot;

a changeover switch that causes the third terminal to be electrically connected to any one of the first sound control unit and the second sound control unit in an alternative way; and a detection unit that detects which one of the first detachable speaker unit and the second detachable speaker unit is installed in the slot, the detection unit comprises a detection switch formed on the bottom surface of the slot, when the first terminal comes into contact with the third terminal by installing the first detachable speaker unit in the slot such that the first surface of the first detachable speaker unit and the bottom surface of the slot face each other, the changeover switch causes the third terminal to be electrically connected to the first sound control unit, and when the second terminal comes into contact with the third terminal by installing the second detachable speaker unit in the slot such that the second surface of the second detachable speaker unit and the bottom surface of the slot face each other, and the changeover switch causes the third terminal to be electrically connected to the second sound control unit, wherein one of the first surface of the first detachable speaker unit and the second surface of the second detachable speaker unit comprises a part to be detected, and the detection unit detects which one of the first detachable speaker unit and the second detachable speaker unit is installed in the slot, based on whether or not the detection switch detects the part to be detected, and the changeover switch switches a connection destination of the third terminal to the first sound control unit or the second sound control unit according to a detection results through the detection unit; and wherein the control unit oscillates the parametric speaker to output an ultrasonic wave from each of a plurality of regions that are arranged in an array, and the control unit further oscillates an audible sound from the piezoelectric element.

12. The electronic apparatus according to claim 11, wherein the first detachable speaker unit and the second detachable speaker unit have a same exterior shape.

13. The electronic apparatus according to claim 11, wherein the parametric speaker comprises a plurality of piezoelectric elements configured to vibrate at an ultrasound frequency of 20 kHz or more.

14. The electronic apparatus according to claim 13, wherein the ultrasound frequency is demodulated to produce an audible sound.

15. The electronic apparatus according to claim 11, wherein the part to be detected is a convex portion, and
the detection unit detects which one of the first detachable speaker unit and the second detachable speaker unit is installed in the slot, based on whether or not the convex portion is inserted into the detection switch.

* * * * *